May 20, 1958

D. POLLAN 2,835,166

SLIDE CARRIER

Filed Dec. 31, 1953

INVENTOR
DAVID POLLAN
BY

ATTORNEY

May 20, 1958
D. POLLAN
2,835,166
SLIDE CARRIER
Filed Dec. 31, 1953
2 Sheets-Sheet 2
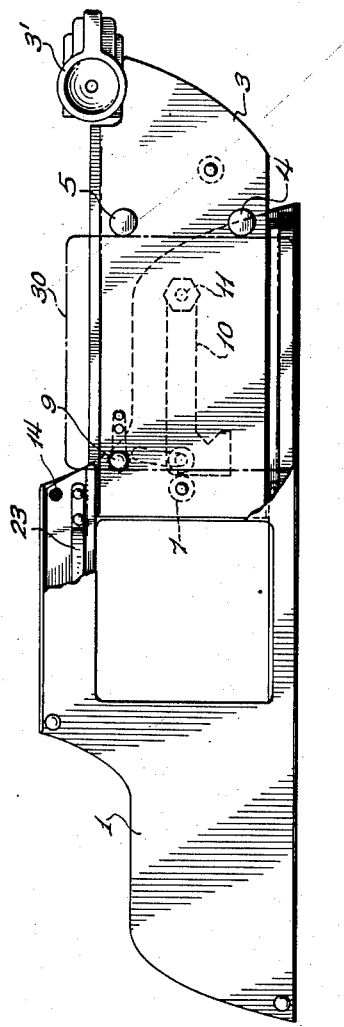
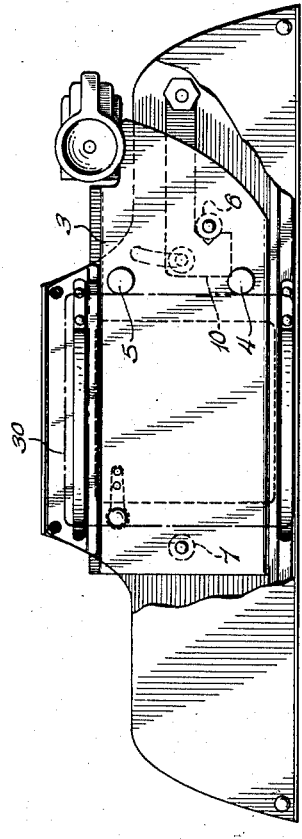
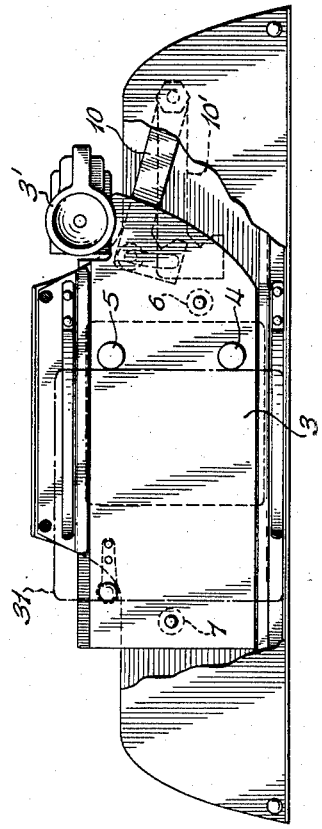
INVENTOR
DAVID POLLAN
BY
ATTORNEY

United States Patent Office 2,835,166
Patented May 20, 1958

2,835,166

SLIDE CARRIER

David Pollan, Jackson Heights, N. Y., assignor to Viewlex, Inc., a corporation of New York Application December 31, 1953, Serial No. 401,517

5 Claims. (Cl. 88—28)

This invention relates to slide carriers for slide projectors and more particularly, to slide carrier means which are adapted to eject the last slide.

Slide carrier means for projectors generally comprise a hollow member which is inserted in the projector and an inner pusher member which is adapted to be retracted to receive a slide, then to position it in front of the light source for projection and then to be retracted to receive another slide. When the second slide is positioned in front of the light source, the first slide is ejected out the other side of the slide carrier.

One of the difficulties of conventional slide carriers is that there is no positive means to eject the last slide, since there is no other slide behind it. Therefore, it is necessary to try to push the slide out with the operator's fingers or insert a rod or some other device to push it out.

Conventional slide carriers do not have means for locking the inner and outer members of the slide carriers for safe and convenient transporting. In other words, if the slide carrier is picked up or dropped, the inner member is liable to slide out and become lost or damaged.

The present invention provides a novel slide carrier means having a rotatable hook mounted inside the outer shell member which is adapted to engage a button on the inner pusher member in order to properly push the slide for viewing. The slides preceding the last slide are ejected in the conventional manner by having the succeeding slide push out each preceding slide. However, when we come to the last slide, the hook is rotated, thereby, releasing the inner pusher member and permitting it to travel further to thereby eject the last slide sufficiently so that it may be conveniently removed from the slide carrier.

Means are also provided for locking the inner pusher and outer shell members together for safe transport. This is done by dropping the hook when the inner member is in a position just after ejecting the last slide. Therefore, the slide carrier may be transported easily and conveniently without any danger of the inner slide pusher dropping out.

Accordingly, a principal object of the invention is to provide new and improved slide carrier means.

Another object of the present invention is to provide new and improved slide carrier means having means to eject the last slide.

Another object of the present invention is to provide new and improved slide carrier means having means to eject the last slide and means to lock said slide carrier members for safe and convenient transport.

Another object of the present invention is to provide new and improved slide carrier means comprising a shell member adapted to be inserted in a projector and adapted to receive slides, a hook rotatably mounted to one inside wall of said shell, a slide pusher member adapted to be slidably mounted in said shell and means on said slide pusher adapted to engage said hook to thereby position said slide in viewing position, said hook being adapted to be rotated to permit ejection of the last slide and means cooperating with said hook to lock said pusher members for safe transport.

These and other objects of the invention will be apparent from the following specification and drawings of which:

Figures 4, 5 and 6 are front views illustrative of the operation of the invention.

Figure 1:
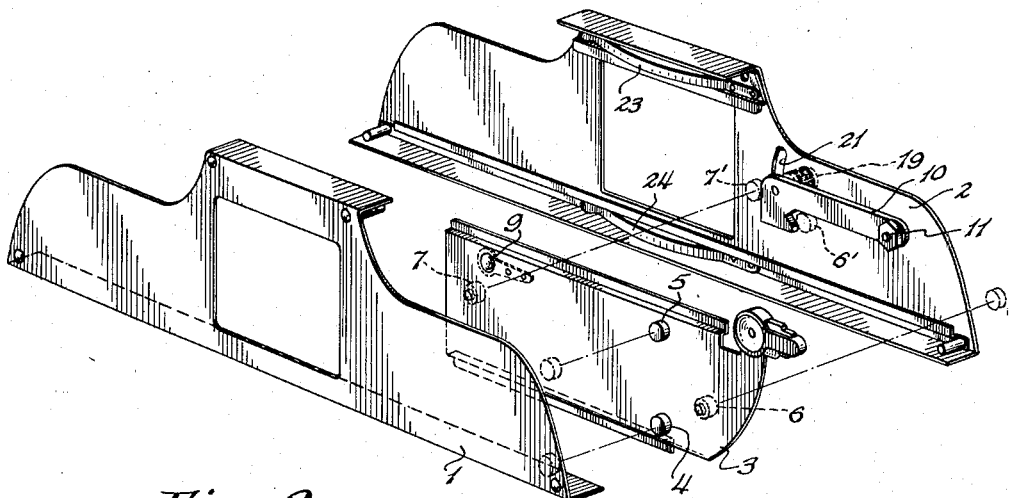
Figure 1 shows an exploded perspective view of an embodiment of the invention.

As shown in Figure 1, the slide carrier comprises two elongated members 1 and 2 which are apertured to permit the projected light beam to pass through the slides being viewed, and which are adapted to be riveted together so as to form a hollow space in which a slide pusher member 3 is slidably mounted. The pusher member 3 has a pair of buttons 4 and 5 which are adapted to push the slides as will be more fully explained. On the other side of the pusher member are a pair of stop buttons 6 and 7 which are adapted to cooperate with the hook 10 which is rotatably mounted on the member 2 at the point 11. The hook 10 has mounted on it a thumbscrew lock 19 which extends through the curved slot 21.

When the pusher member is retracted to the right, the button 7 hits the hook 10 as shown at 7', thereby stopping the pusher member 3. When the pusher member 3 is pushed in the opposite direction, the button 6 is stopped by the inside surface at the hook at 6'.

Figure 2:
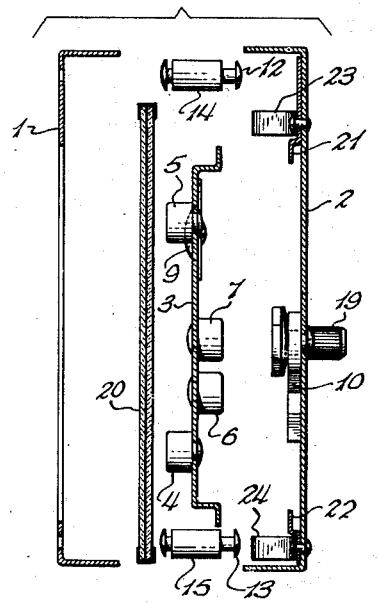
Figure 2 shows an exploded sectional side view.
Figure 3:
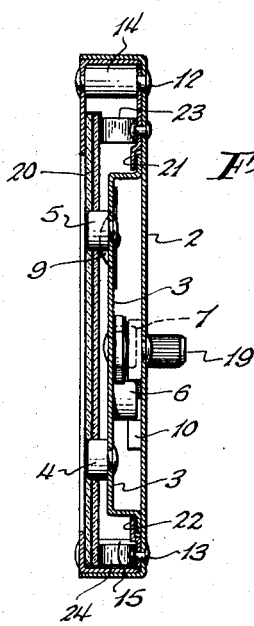
Figure 3 is a sectional side view of the invention.

Figures 2 and 3 show sectional views of the invention of Figure 1, Figure 2 being an exploded view. The outer members 1 and 2 are connected by rivets 12, 13 and are spaced apart by the spacers 14, 15. The slide 20 is inserted between the pusher member and the member 1. The pusher member slides between the member 2 and two rail members 21 and 22 which are mounted on the member 2. The slide is held in position by means of springs 23, 24. Spring 9 may be riveted onto pusher 3. Its purpose is to prevent jamming of thin slides.

Figure 4 shows the pusher member 3, which is operated by the handle 3', in retracted position. In this position, the slide 30 is inserted from the top. The pusher member 3 is positioned in this position by the pusher button 7 bearing against the left hand side of the hook 10.

The pusher member 3 is now pushed to the left to the position shown in Figure 5. The pusher member is positioned by the button 6 bearing against the inside portion of the hook 10. The slide 30 is now in position for viewing and the pusher member is then retracted to receive another slide. When the pusher member 3 is again returned to the left, the second slide will push the slide 30 out to the left where it can be removed.

The difficulty with conventional slide carriers has been that it is difficult to eject the last slide since the last slide will be in the position shown in Figure 5, where it is not accessible to the fingers and must be pushed out with a rod or pencil. The present invention solves this problem since by raising the hook 10, the pusher 3 may be pushed far enough as shown in Figure 6, so that the last slide may be picked up by the fingers at the point 31 and removed from the slide carrier.

Now, if the hook 10 is dropped to the position 10' in Figure 6, the pusher member 3 will be locked inside the shell of the carrier members since the button 6 will now be on the other side of the hook so that the pusher member cannot be moved to the right. It cannot be moved to the left because the projecting handle 3' runs into the upper portion of the shell members. Therefore, this position of the pusher member 3 with the hook down as shown at 10' provides a safe transport position for the slide carrier, since the sliding member 3 cannot fall out and become damaged or lost.

I claim:

1. A slide carrier for projectors comprising a pair of members forming a shell adapted to be inserted in a projector, said shell being adapted to receive slides at one end, a hook rotatably mounted on one inside wall of said shell, a slide pusher member adapted to be slidably mounted in said shell and having means to push said slides, a button on said slide pusher adapted to engage said hook to thereby position said slide in viewing position, and means to rotate said hook to disengage said button to enable said pusher member to eject the last slide, out the other end of said shell.

2. A slide carrier for projectors comprising a shell member adapted to be inserted in a projector, said shell member being adapted to receive slides at one end, a hook rotatably mounted to one inside wall of said shell, a slide pusher adapted to be slidably mounted in said shell and having means on one side to push said slides and having means on its other side adapted to engage said hook to position a slide in viewing position, and means to eject the last slide out the other end of said shell comprising means to rotate said hook, to permit further travel of said pusher means.

3. In a projector slide carrier of the type having a shell member, a sliding pusher member in said shell adapted to receive slides on one side of said shell when in retracted position and adapted to position said slides in viewing position and eject the preceding slide out the other side of said shell as a slide is placed in viewing position; a hook rotatably mounted on said shell member and adapted to engage said pusher member to position a slide in viewing position and means to eject the last slide comprising means to release said hook, to allow further travel of said pusher member.

4. A slide carrier for projectors comprising a hollow assembly adapted to be inserted in a projector, said shell being adapted to receive slides, a hook rotatably mounted to one inside wall of said shell, a slide pusher member adapted to be slidably mounted in said shell and having means to push said slides, a button on said slide pusher adapted to engage said hook to thereby position said slide in viewing position, means to rotate said hook to disengage said button to enable said pusher member to eject the last slide and means to engage said hook to lock said slide pusher to said hollow assembly for safe transport.

5. In a projector slide carrier of the type having a shell member, a sliding pusher member adapted to receive slides when in retracted position and adapted to position said slides in viewing position and eject the preceding slide as a slide is pushed into viewing position, a hook rotatably mounted on said shell member and adapted to engage said pusher member to position said slide, means to eject the last slide comprising means to release said hook, and means to lock said sliding pusher to said shell for safe transport.

References Cited in the file of this patent

UNITED STATES PATENTS

| | | |
|---|---|---|
| 577,022 | Halsey | Feb. 16, 1897 |
| 1,035,872 | Goodrich | Aug. 20, 1912 |
| 2,364,788 | Harvey et al. | Dec. 12, 1944 |
| 2,468,566 | Marcus et al. | Apr. 26, 1949 |
| 2,522,760 | Lowber et al. | Sept. 19, 1950 |
| 2,543,520 | Bradford et al. | Feb. 27, 1951 |
| 2,634,653 | Barth | Apr. 14, 1953 |

FOREIGN PATENTS

| | | |
|---|---|---|
| 66,627 | Germany | Jan. 12, 1893 |